INVENTOR.
Ariosto Seragnoli
BY
Agent

United States Patent Office 3,450,246
Patented June 17, 1969

3,450,246
APPARATUSES FOR TRANSFERRING ARTICLES
Ariosto Seragnoli, Via Bellinzone 31,
Bologna, Italy
Filed May 5, 1967, Ser. No. 636,491
Claims priority, application Italy, May 6, 1966,
10,405/66
Int. Cl. B65g 47/82, 47/26
U.S. Cl. 198—24                                   4 Claims

ABSTRACT OF THE DISCLOSURE

This disclosure relates to an apparatus of the type used for transporting or transferring articles from delivering machine to receiving machines, this apparatus comprising first conveyor means for supplying the articles from delivery machines to a transfer station and second conveyor means for supplying said articles from said transfer station to a reception machine, pusher means for transferring the articles to said transfer station from said first conveyor means and to said second conveyor means from said transfer station, above said transfer station storage means, in which the articles are transferred by elevator means, interception means, means for intercepting the flow of articles under predetermined operative conditions, driving means for actuating the pusher means and the elevator means and control means for controlling the actuation of the operative parts of the apparatus.

---

The present invention relates to an apparatus of the type used for transporting or transferring articles from delivering machines to receiving machines, such as the machines of the systems for automatically wrapping articles, and more particularly the invention is concerned with an apparatus of this type, in which transfer or transport of the articles occurs by always active or positive cyclic phases.

In the present systems for automatically wrapping articles, the single receiving machines are, as known, provided as having a receptive capacity greater than delivery capacity of the single delivering machines, and between said two groups of delivering and receiving machines respectively, in order to meet requirements to increase production capacity, a transferring apparatus is provided adapted to store a predeterminated amount of articles to be delivered in the event of a stop of the receiving machines and to supply said stored articles to the receiving machine in the event of delivery being stopped by the corresponding delivering machine(s).

Accordingly these transferring apparatuses are provided so as to allow operation of the delivering or receiving machines in case of a respective individual stop, only for a restricted period of time determinated by the storing capacity thereof and in any case all of the storing-transfer apparatuses, at present known and used in the above-mentioned systems for automatically wrapping articles, are however designed and carried out in such a way as only to partly meet the above requirements for increasing the production capacity of these systems, and particularly do not fully make use of the receptive capacity of the receiving machine which, as stated above, is greater than the delivery capacity of the delivering machines. With such transfer apparatuses under specific stop conditions of delivery of the delivering machines it also occurs that the start of supply or transfer for the stored articles to the receiving machine being in operation takes place with one cycle delay, and this will obviously constitute a further restriction to the utilization of the receptive capacity of said receiving machine.

It is the main object of the present invention to provide a storing transfer apparatus, of the type and for the use mentioned above adapted to allow a more effective utilization of the receptive capacity of the receiving machine independently of the delivery capacity of the delivering machines.

It is another object of the invention to provide an apparatus in which transport or transfer of the articles to the receiving machine takes place at always positive cyclic phases.

Still another object of the present invention is to contemplate the possibility of providing such an apparatus for transporting the articles to the receiving machine having a considerable autonomy of operation of said receiving machine upon stopping of the delivering machines at any delivery moment.

A further object of the invention is to provide the possibility of having, on account of the high operative speed, said articles well aligned to one another, particularly at the storing steps within the storage.

A still further object of the present invention is to provide such an apparatus adapted to attain the objects referred to by a structure particularly simple, readily obtainable of reliable operation, of a simple and practical use and also comparatively of low cost in view of performances provided thereby.

These and other objects are all attained by an apparatus for transferring articles from delivering machines, particularly adapted for automatic wrapping machines and like, of the class essentially formed of first transport means for supplying the articles from at least one delivering machine to a transfer station; of second transport means for supplying said articles from said transfer station to at least one receiving machine; of a storing up storage means located at said transfer station between said first and second transport means for supplying the articles from said delivering machine to said transfer station and from said transfer station to said receiving machine respectively; of pusher means in said transfer station for transferring the articles being transported to said transfer station by said first transport means to said second transport means for supplying the receiving machine passing through said storage means; of elevator means timed with said pusher means, adapted to transfer by control the articles into said storage means during the step of transfer thereof from said first transport means at the transfer station to said second transport means at the receiving machine; of intercepting means adapted to intercept the articles on said first transport means at the transfer station prior to said storage means, and of means for the removal of articles from said storage means is to be applied to said transport means at the receiving machine through said pusher means; wherein a combination is provided, comprising means adapted to cyclically drive said pusher means according to an intermittent movement which includes a halt close to said storage means at least during its movement to said second transport means for supplying the articles to the receiving machine, means for actuating a plurality of times at each cycle said elevator means in time relationship with said halt of said pusher means and at the return movement step of said pusher means respectively upon attaining at least the position corresponding to said halt, and interlocking means for controlling in time relationship to one another said actuating means of said elevator means, said intercepting means and means for enabling the drawing of articles from said storage means.

Further features and advantages will be more apparent from the following detailed description of a preferred but not exclusive embodiment of the apparatus according to the invention, shown merely by way of an example and not of a limitation in the accompanying drawings, in which.

Figure 1:
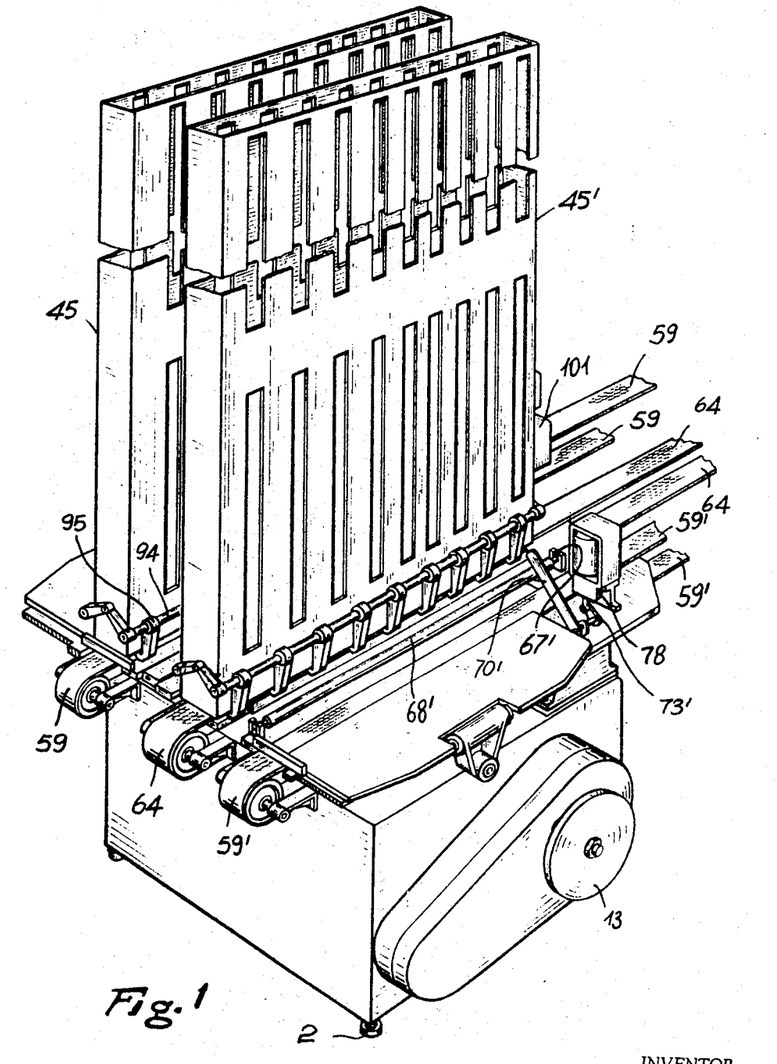
FIG. 1 is a perspective view of the apparatus and corresponds to a smaller scale of combined FIG. 1a, 1b, 1c and 1d.
Figure 1A:
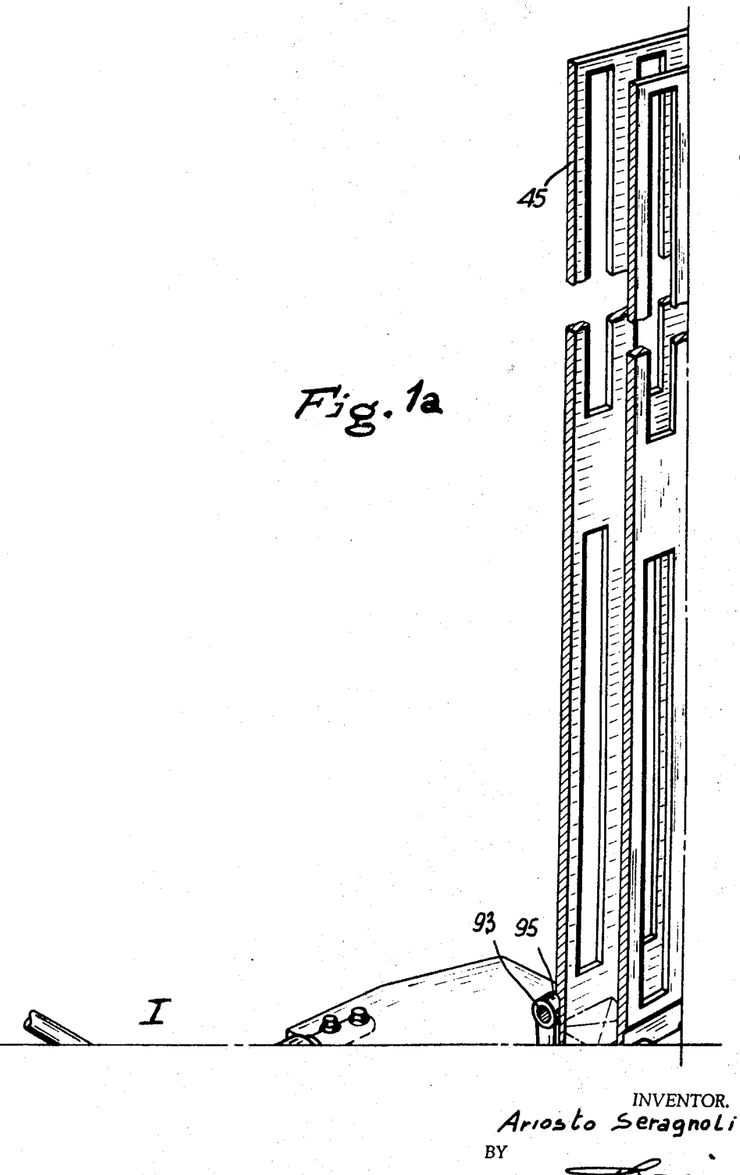
FIG. 1a, 1b, 1c, 1d when read together by drawing them near between each other in the order defined by quadrants I, II, III and IV, show in a perspective view partially in section and with parts broken away the apparatus, in a larger scale.
Figure 1B:
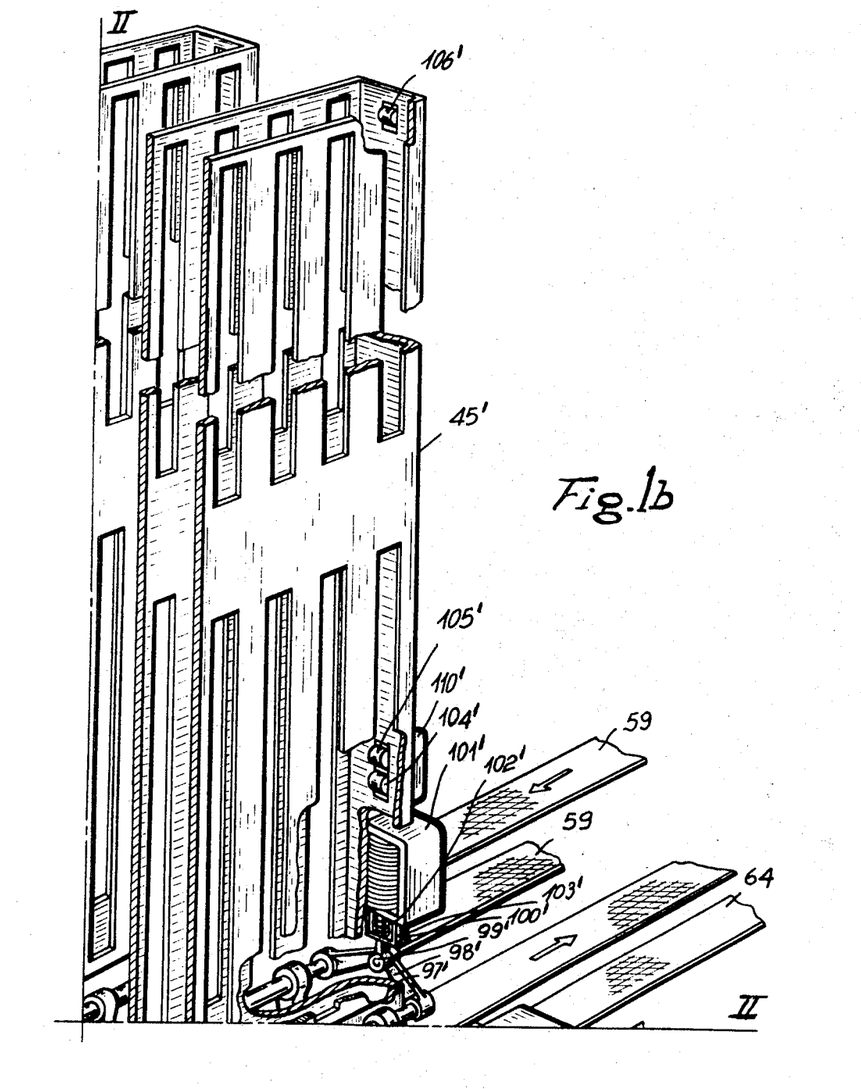
Figure 1C:
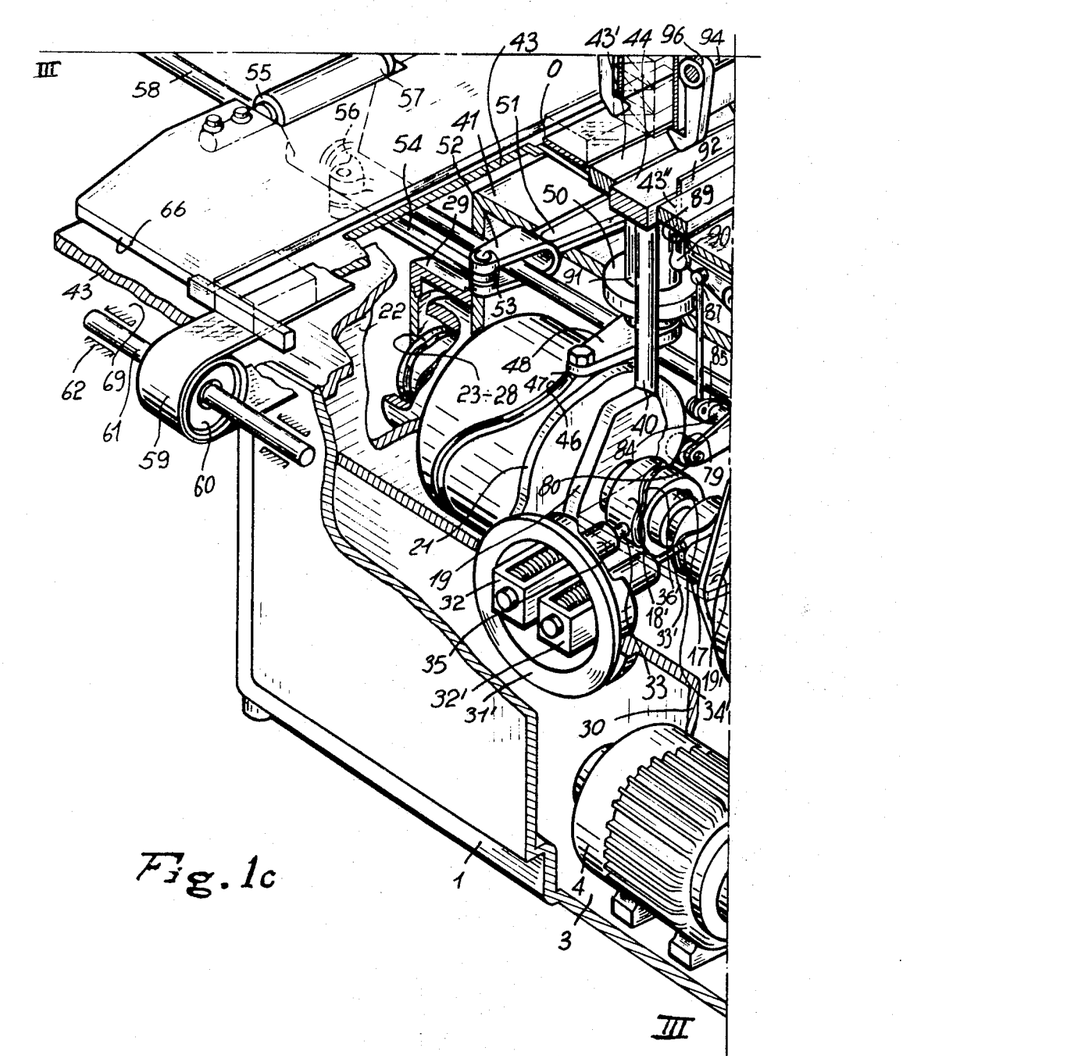
Figure 1D:
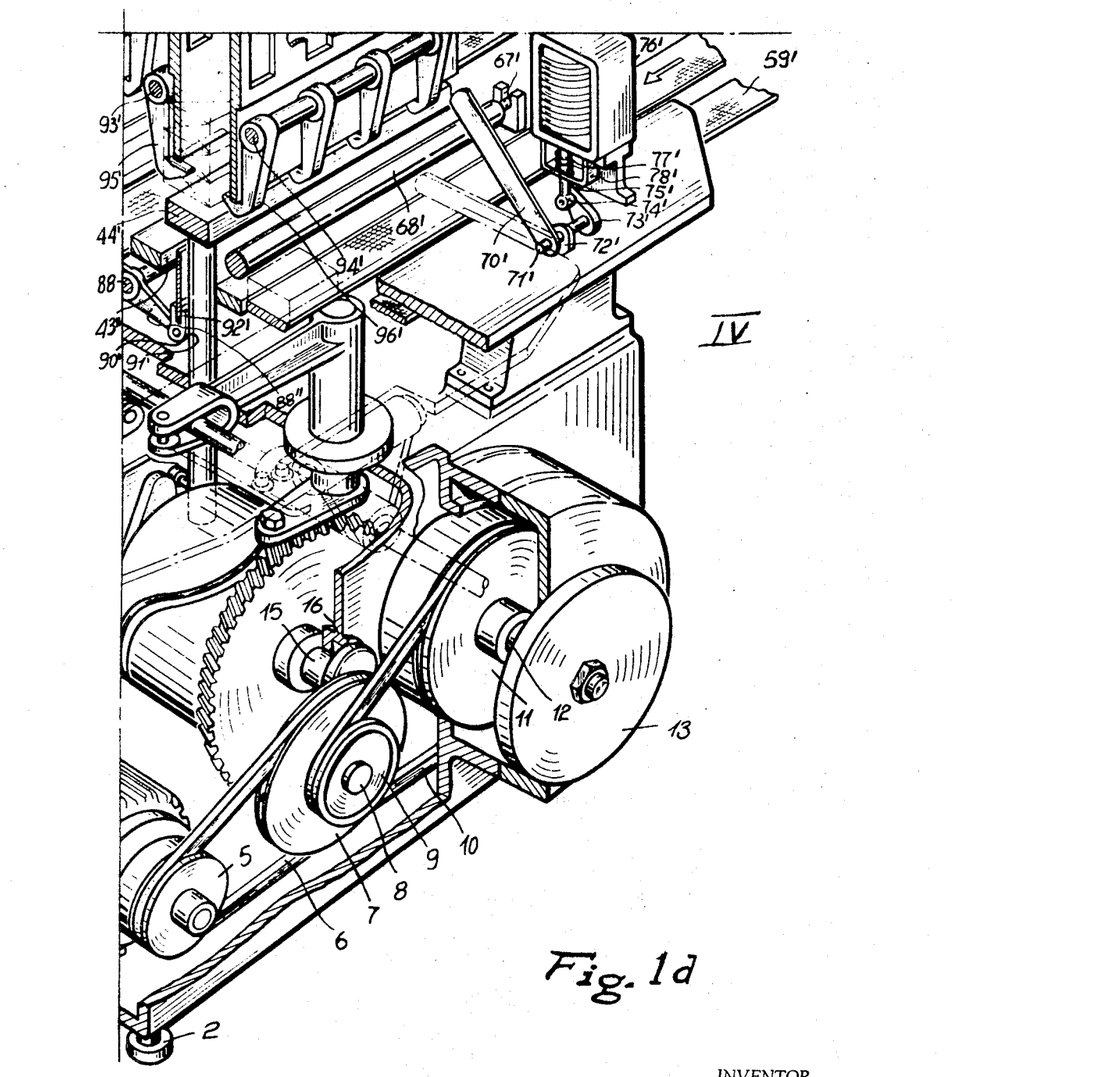

Referring to FIG. 1, it will be seen the apparatus of the invention mechanically comprises a substantially hollow-shaped base 1, having bearing feet 2 and internally of which an electric motor 4 for driving said apparatus is fixed on the bottom 3 thereof. A driving pulley 5 is keyed on the shaft of said electric motor 4, said pulley transmitting the motion through a belt 6 to a reduction pulley 7 carried by a shaft 8 rotably supported within suitable housings (not shown) of said base 1. Co-axially integral with said pulley 7, there is provided a second pulley 9 of a less diameter, which through a belt 10 transmits the motion to a further reduction pulley 11 which is keyed on a shaft 12 rotably carried by the base 1.

Outwardly of the base 1 a handwheel 13 is mounted on said shaft 12 for manual operation of the apparatus in a known manner, while inside of said base 1, at a position not shown in the figure, there is idly mounted a clutch-like disc, of a kind already known in this type of apparatus which rotates together with the above pulley 11. At a position not shown in FIGURE 1, there is keyed on shaft 12 an inclined-tooth gear meshing with the inclined-tooth gear 14 which in turn is keyed on the main shaft 15 of the apparatus. Said shaft 15 is rotably carried on fixed bearings 16 of base 1. At the vertical median plane of the apparatus, at right angles to the above shaft 15, an annular fixed stop abutment 17 is provided and on opposite sides to said stop 17, symmetrically to said median plane, are mounted on said shaft 15, cantilevered to one another for 180°, two pairs of cams 18–19 and 18'–19', respectively integral to one another and upon rotation with but slidable thereto said shaft 15, as hereinafter better shown, and two cams 20–20' integrally rotating with said shaft 15.

A cam 21 is provided integral with cam 20, coaxially to shaft 15 and located between said cam 20 and cam 19, while externally of the rear wall 22 of base 1, there are keyed on the above shaft 15 a plurality of cams 23, 24, 25, 26, 27 and 28 enclosed within a housing formed by the envelope 29 integral with said rear wall 22 of base 1.

The contour for all of the above cited cams can be seen from the diagram shown in FIG. 3 and will be hereinafter more apparent from the description of the operation for the apparatus given with reference also to the electro-mechanical diagram shown in FIG. 2.

A vertical partition 30 parallel to shaft 15 is provided inside of the hollow base 1, two electromagnets 32–32' being supported from said wall 30 by means of the support element 31. The eddy cores or armatures 33–33' of said electro-magnets 32–32' carry at the free end thereof a respective idle roller 34–34' designed to engage the grooves 36–36' of the slidable cams 18–18' against the action of the counter springs 35–35' when said electro-magnets 32–32' are energized as hereinafter will be seen. In the grooves 37–37' of cams 19–19'; rollers 38–38' are designed respectively to be engaged, said rollers being idly carried by a corresponding pin 39–39' radially integral with a respective vertical rod 40–40' extending above the top plane 41 of base 1 through the respective opening 42–42' to the past, as will be seen hereinafter, the horizontal plane 43 supported by said base 1 through support elements (not shown in FIG. 1). At the upper free end of said vertical rods 40–40' a corresponding horizontal cross member or plate 44–44' is carried, which extends at right angles to shaft 15.

Rods 40–40', together with the respective cross members 44–44', constitute elevators operable, as it will be seen hereinafter, by said cams 19–19', and are designed with said horizontal cross members 44–44' to form the continuity of the horizontal plane 43 when such elevators are at their lowermost position. A corresponding chute 45–45' having a vertical column of a parallelepiped shape and rectangular hollow horizontal section (see FIG. 1) is disposed, being supported in a known manner, at the plates 44–44' of said elevators in a position raised from the horizontal plane, as it will be seen hereinafter.

A corresponding roller 47–47' is always engaged with the grooves 46–46' of cams 20–20', said rollers being idly carried at the free end of a respective arm 48–48' radially integral with the lower end of a corresponding vertical pin 49–49' rotably supported on a support element 50–50' carried by the top wall 41 of the hollow base 1. The end of a radial arm 51–51' is keyed on the upper end of said vertical pins 49–49', extending above said top wall 41 but below the horizontal plane 43, the other end of which radial arm terminates according to a fork-shaped element 52–52'. Between the prongs or branches of said fork 52–52', there is pivoted at 53, and at 53' respectively the end of a rod 54–54', the respective other end of which is pivoted at 55–55', between the lings 56–56' of a support element 57–57', slidably mounted and guided on a corresponding horizontal guide rod 58–58' supported parallel to shaft 15 in a known manner (not shown in FIG. 1) by the hollow base 1 above the top wall 41 thereof and below the horizontal plane 43.

A conveying belt, respectively shown at 59–59', is disposed externally of the two storages 45–45', looking at FIG. 1 at the right and at the left respectively between the sections of horizontal plane 43–43' and flushed with said horizontal plane. Said conveying belts 59–59' are loop-wound on idling pulleys, of which only the pulley 60 is shown in FIG. 1. Said pulleys are mounted on a corresponding shaft, only shaft 61 being shown, supported by base 1 through fixed bearings 62, and are driven by a chain wheel (not shown) which is keyed on shaft 12. From said chain wheel, through a chain (not even shown) motion is transmitted to another chain wheel (not shown) located within the support element 63 carried by base 1 and keyed on the axis of one of the idling pulleys of said belts. A third conveying belt 64 is disposed between the two above chutes 45–45', at a slightly lower level than the surface of the horizontal plane 43 and between two sections 43" of said plane 43, said belt being also loop-wound on idling pulleys, not shown. All of these conveying belts are driven by the above chain wheel in known manner and need not to be particularly shown in the drawings. A corresponding pusher 66–66' is coupled to supports 57–57' by screws 65–65' or other equivalent known means, said pushers being, as hereinafter it will be seen, designated to slide on the horizontal plane 43, 43', 43" from a retracted position corresponding approximatively with the pushing edge thereof to the position, shown in FIG. 1 as by way of an example flushed with the edge of the conveying belts 59–59' external to chutes 45–45', to a maximum stroke position until said respective pushing edge is brought at the respectively opposite edges of the central conveying belt 64 passing above the plates 44–44' of the elevators and below the above chutes 45–45'.

A corresponding horizontal roller 68–68' is supported in a freely rotatably and vertically raisable and lowerable fashion by fork-shaped support elements 67–67' at a position above the sections 43' of the horizontal plane, beneath which the articles being pushed by the pusher elements 66–66' towards the above conveying belts are designed to pass, as hereinafter will be seen.

A corresponding fixed plate element 69–69', carried by the horizontal plane 43 and extending at right angles above the respective conveying belt 59–59', is provided at the vertical plane parallel to shaft 15 and passing through the left side, as seen in FIG. 1, of the pusher elements 66–66', whereas the opposite side, i.e. the right side always for an observer of FIG. 1, of said pusher elements 66–66' there is provided an element respectively indicated at 70–70', movable in the vertical plane passing through said right side of the corresponding pusher element 66–66'. Said movable elements 70–70' are of a blade-like configuration and are designed for assuming two positions, a lowered position on the respective conveying belt 59–59' as an intercepting element of the articles on said conveying belts 59–59', and a raised position as hereinafter more particularly shown. Said intercepting blade elements 70–70' are with an end thereof integrally mounted to the free end of a corresponding mandrel 71–71' rotably supported by a respective support 72–72' fixed on the horizontal plane 43. At the other end said mandrels 71–71' fixedly carry a respective radial arm 73–73', at the free end of which the free end of the eddy core or armature 75–75' of a corresponding electromagnet 76–76', secured on the above horizontal plane 43, is pivoted at 74–74'.

A corresponding counter spring 77–77' is slipped on said cores or armatures 75–75', said spring acting between an annular projection fixed to said core (not shown in the figure) and a respective fixed collating element 78–78'.

A roller 79 co-operates with the cam 21, said roller being idly carried by a pin 80 secured to the free end of an arm 81, the other end of which is secured to a pin 82 rotably supported on the support element 83 fixed on the bottom 3 of base 1. At the other end of said pin 82 there is secured the end of an arm 84, at the free end of which the end of a rod 86 is pivoted at 85, said rod upwardly vertically extending above the top wall 41 of base 1 and below the horizontal plane 43. The other end of said vertical rod 86 is pivoted at 87 to the arm 88' of a two-arm lever 88 rockingly carried on a shaft 89 horizontally supported by fixed supports associated with the base and not shown in FIG. 1. At the free ends of the arms 88'–88'' of the rocking two-arm lever 88 a corresponding support element 91–91' is pivoted at 90–90', to which support element a corresponding metal strips 92–92' terminates, said metal strip upwardly extending between the sections 43'' of the horizontal plane 43 and the plates 44–44' of the corresponding elevator, and extending throughout the horizontal extension of the vertical chutes 45–45' parallelly to the conveying belt 64. A corresponding shaft indicated at 93–94 and 93'–94' respectively, is provided horizonatlly rocking in known manner externally of the side walls of said chutes 45–45', parallel to the conveying belts 59–59' and 64 and adjacent the lower edge thereof.

On each of said horizontal shafts 93–94 and 93'–94' there are secured, by an end thereof, a plurality of members 95–96 and 95'–96' having a configuration according to the other respective end thereof as teeth extending below said lower edge of said side walls of chutes 45–45' as far as the inside of said chutes so as to form, as hereinafter better seen, a partly movable bottom. At such a position of partial bottom of the chutes 45–45', said tooth members 95–96 and 95'–96' are at a respectively facing distance which is greater than the transverse dimension of the cross members 44–44' of the elevators 40–44 and 40'–44'.

At one end thereof, extending beyond the horizontal dimension of chutes 45–45' parallel to the conveying belts 59–59' and 64, said shafts 93–94 and 93'–94' carry at a fixed position the end of a radial arm respectively indicated at 97–98 and 97'–98'. The other end of said radial arms 97–98 and 97'–98' is pivoted at 99–99' respectively in pairs to one another and with the end of core or armature 100–100' of a corresponding electromagnet 101–101' carried by base 1 in a known manner not shown.

A corresponding counter spring 102–102' operating between an annular projection fixed to said cores (not shown in the figure) and a respective fixed plate element 103–103', is slipped on said cores or armatures 100–100'. Two and respectively one corresponding sensing members 104–105, 104'–105' and 106–106' are provided adjacent the upper and lower ends on one of the sides of the chutes 45–45' at right angles to the transmission belts 59–59' and 64, said sensing members resiliently projecting inwardly of said chutes. Said sensing members terminate at a corresponding microswitch 107–108, 107'–108' and 109–109' (see FIG. 2) housed within suitable envelops 110–111 and 110'–111' integral to said chutes.

Figure 2:
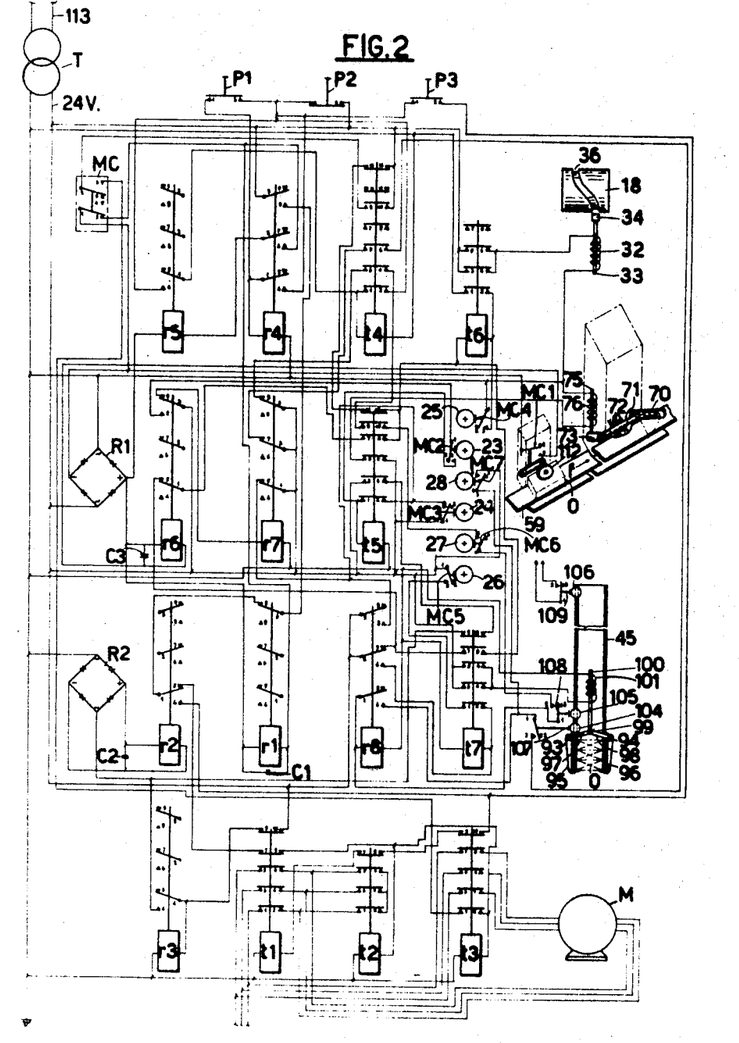
FIG. 2 is the electro-mechanical diagram of the operative principle of said apparatus.

The electromechanical basic relative to only one portion of the apparatus is shown in FIG. 2, comprising a pusher, an elevator and a storing chute or hopper, the equality with the other portion of the apparatus being apparent, said other portion of the apparatus being, as above stated, cantilevered by 180° with respect to the now mentioned portion. In said electro-mechanical diagram there are also shown the parts operated by the wrapping machine and adapted to operate the apparatus of the invention.

In said FIG. 2, in addition to the portions of apparatus which can be operated by the wrapping machine already described in connection with FIG. 1, there are thus shown the three-phase electric motor M for the driving of the wrapping machine and three electromagnetic switches $t1$–$t2$–$t3$ which operate said motor M and in turn are operated as shown in the electromechanical diagram and as will be more evident hereinafter. The electromagnetic switch $t1$ is provided with five pairs of contacts 1–2, 3–4, 5–6, 7–8 and 9–10, the pairs 1 to 6 of which being normally open and the pairs 7 to 10 of which being normally closed. The switch $t2$ is provided with four pairs of contacts 1–2, 3–4, 5–6 and 7–8, the pairs 1 to 6 of which are normally open and pair 7–8 is normally closed, and the switch $t3$ is provided with five pairs of contacts 1–2, 3–4, 5–6, 7–8 and 9–10, the pairs 1 to 8 of which being normally open and pair 9–10 being normally closed.

The wrapping machine according to the example is contemplated such as a two speed machine, and thus the so-called slow speed microswitch MC is shown being disposed on the conveying belt 64 for supplying the articles to said wrapping machine. Said microswitch MC is of the type having two contacts 1–2 movable between fixed changeover contacts 3–4 and 5–6 and has in series a timer formed of a relay $r1$ which is direct current supplied through the current rectifier R1, and a capacitor $c1$ shunted with the operating coil of said relay $r1$, which provided as having three contacts 1–2–3 movable between stationary changeover contacts 4–5, 6–7 and 8–9. A so-called second speed timer is also shown, said timer comprising a relay $r2$ which is direct current supplied through a current rectifier R2, and a capacitor $c2$ shunted with the operating coil of said relay $r2$, which is provided with three contacts 1–2–3 movable between stationary changeover contacts 4–5, 6–7 and 8–9. Said timer is operated by a relay $r3$ provided with three contacts 1–2–3 movable between stationary changeover contacts 4–4, 6–7 and 8–9. A so-called presetting unit for operating the wrapping machine is also part of said machine, said presetting unit comprising a control relay $r4$ operated by a manual press presetting microswitch P1 normally open, a relay $r5$ operated by said relay $r4$ and direct current supplied the current rectifier R1, and a telebreaker $t4$ operated by said relay $r5$. Each of the relays $r4$–$r5$ have three contacts 1–2–3 movable between the stationary changeover contacts 4–5, 6–7 and 8–9, whilst tele-breaker $t4$ has seven pairs of contacts 1–2, 3–4, 5–6, 7–8, 9–10, 11–12 and 13–14, the pairs 1 to 10 of which being normally open and the pairs 11 to 14 being normally closed. For the apparatus being referred to there are instead shown a microswitch MC1 operated by a sensing member 112 disposed on the belt 59 conveying the articles from the delivering or supplying machine to said apparatus. Said microswitch MC1 is provided of such a type that its contacts are in open position when articles being conveyed by belt 59 pass below the sensing member, and in a closed position when no articles are passing. Said microswitch MC1 operates a timer comprising a relay r6 direct current supplied through rectifier R1, and a capacitor c3 shunted with the operating coil of said relay r6, which relay has three contacts 1–2–3 movable between stationary changeover contacts 4–5, 6–7 and 8–9. Said relay r6 operates a feeding relay r7 having three contacts 1–2–3 movable between stationary changeover contacts 4–5, 6–7 and 8–9, and a control electromagnetic switch t5, cyclically through microswitches MC2–MC3 actuated by closing cams 23 and opening cams 23 and opening cams 24 of electromagnetic 76 operating the intercepting blade member 70.

Said electromagnetic switch t5 has six pairs of contacts 1–2, 3–4, 5–6, 7–8, 9–10 and 11–12, the pairs 1 to 10 of which being normally open and the pair 11–12 being normally closed. The switch t6, having four pairs of contacts 1–2, 3–4, 5–6 and 7–8 normally open, is provided for control of electromagnet 32 operating elevator 40–44 through cams 18–19 and cyclically operated by switch t5 through microswitch MC4 operated by cam 25. The electromagnet 101 operating the tooth members 95–96 associated with the storing chute or hopper 45 as a partial movable bottom of said chute is operated by relay r8 and switch t7. Said relay r8 has three contacts 1–2–3 movable between stationary changeover contacts 4–5, 6–7 and 8–9 and is cyclically operated by a switch t5 through the microswitch MC6 actuated by cam 27, while electromagnetic switch t7 has five pairs of contacts 1–2, 3–4, 5–6, 7–8 and 9–10, the pairs 1 to 6 and 9–10 of which being normally open and the pair 7–8 being normally closed. The self-excitation pair 1–2 of this switch t7 is operated by the microswitch MC5 actuated by cam 26. MC7 is a microswitch which is cyclically operated by cam 28 and is adapted to preset elevator 40–44 to operation and tooth members 95–96 to closure so as to cause the pile of articles to re-enter the storing chute 45, as it will be better seen hereinafter from the examplary operation of the apparatus P2 and P3 indicate two manual stop press microswitches normally closed and respectively normally open for operating the intermittent apparatus, and T indicates a current transformer being supplied by mains 113 and having an output of 24 volts.

Figure 3:
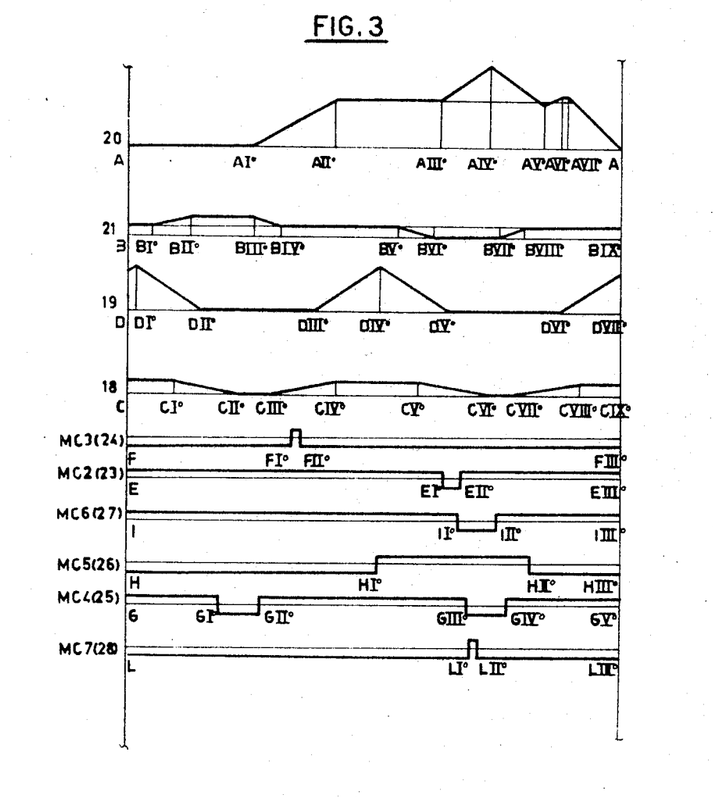
FIG. 3 shows the timing diagram of said apparatus.

As previously stated, the diagram of the phase-times for cams 23 to 28 and of operation and dwell times for cams 18 to 21 is shown in FIG. 3. The base of said diagram is equal to a machine cycle, corresponding to 360 degrees of rotation of the main driving shaft 15. Supposing to assume as a starting base the maximum retraction position of pusher 66 (see FIG. 1), the operating cam 20 for said pusher 66 contemplates a dwell A–AI°, a first advancement AI°–AII° as far as the pushing edge of the pusher is brought adjacent the closer edge thereto of the cross member 44 of the elevator 40–44, a dwell AII°–AIII°, a second advancement AIII°–AIV° as far as said pushing edge is brought adjacent the closer edge thereto of the conveying belt 64, a first return stroke AIV°–AV° as far as the above-mentioned pushing edge is brought back nearly to the starting position of the second advancement AIII°–AIV°, a short reversal of movemen AV°–AVI°, a short dwell AVI°–AVII° and finally a return from point AVII° to the starting position A.

Cam 21 is provided so as to operate the plate strips 92–92′, the position being respectively cantilevered by 180° to one another and in phase with times A of cam 20, as can be seen in FIG. 3, and according to times B–BI°, corresponding to a partially raised position, BI°–BII° of a stroke to a maximum raising position, BII°–BIII° of a dwell at the maximum raising position, BIII°–BIV° of return to the partially raised position, BIV°—BV° of dwell at such partially raised position, BV°–BVI° of a stroke to a maximum lowering position, BVI°–BVII° of dwell at such maximum lowering position, BVII°–BVIII° of a stroke to the partially raised position, BVIII°–BIX° of dwell in conjunction with B–BI° at such partially raising position. Always in phase with the above-mentioned A and B times, also the co-operation times of electromagnet 32 with cam 18 and of cam 19 operating the elevator 40–44 can be taken. Such times are respectively indicated by C–CI°–CII°–CIII°–CIV°–CV°–CVI°–CVII°–CVIII°–CIX° and D–DI°–DII°–DIII°–DIV°–DV°–DVI°–DVII°.

Diagrams concerning cams 23 to 28 for operating microswitches MC2 to MC7 are referred to a so-called neutral line, below which the closing times are indicated and above the opening times for said microswitches. The relative opening and closing cyclic periods are respectively indicated, in order, by the letters E to EIII°, F to FIII°, G to GV°, H to HIII°, I to I III°, and L to LIII°.

The apparatus above described in connection with FIGURES 1–3, hereinafter being referred to as X machine, in combination with one or more supplying machines for articles to be wrapped, hereinafter being referred to as Y machine, and a wrapping machine for said articles, hereinafter being referred to as Z machine, is, as a principle, subjected to the following operative conditions:

(I°) Y and Z machines being operative; in X machine it will be:

(a) Microswitch MC1 open (presence of articles to be wrapped under sensing element 112 and arriving from Y machine on the conveying belt 59);

(b) Intercepting blade element 70 at raised position of not interception:

(c) Tooth members 95–96 associated with the storing chute 45 at a partial movable bottom closing position of said chute;

(d) Elevator 40–44 stationary;

(e) Continuously moving pusher 66 supplies the conveying belt 64 from conveying belt 59 passing above the elevator 40–44 and below the storing chute 45.

(II°) Y machine stationary and Z machine operating; in X machine it will be:

(a) Microswitch MC1 closed (absence of articles to be wrapped under the sensing element 112);

(b) Intercepting blade element 70 at the lowered intercepting position;

(c) Tooth members 95–96, associated with the storing chute 45, at opening position;

(d) Elevator 40–44 stationary;

(e) Continuously moving, pusher 66 supplies the conveying belt 64 from the pile of articles stored in chute 45.

(III°) Y machine operating and Z machine stationary; in X machine it will be:

(a) Microswitch MC1 open (presence of articles to be wrapped under the sensing element 112 arriving from Y machine on the conveying belt 59);

(b) Intercepting blade element 70 at a raised position of not interception;

(c) Tooth members 95–96, associated with storing chute 45, at a partial movable bottom closing position of said chute;

(d) Elevator 40–44 operating for storing articles into chute 45;

(e) Continuously moving, pusher 66 supplies articles to be wrapped on elevator 40–44 below storing chute 45 from conveying belt 59.

(IV°) Y and Z machines stationary; in X machine it will be:

(a) Microswitch MC1 closed (absence of articles to be wrapped under the sensing element 112);

(b) Intercepting blade element 70 at a lowered intercepting position;

(c) Tooth members 95–96, associated with storing chute 45, at a partial movable bottom closing position of said chute;

(d) Elevator 40–44 stationary;

(e) Pusher 66 in continuous free movement.

(V°) Y machine operating, Z machine stationary and storing chute full; in X machine it will be:

(a) Should Z machine not start again, conditions repeating according to point III° are interrupted by microswitch 109 of chute 45, which stops Y machine bringing the unit to operating conditions according to point IV°.

(VI°) Y machine stationary, Z machine operating, storing chute about to exhaust stored articles; in X machine it will be:

(a) Should Y machine not start again, conditions repeating according to point II° are interrupted by microswitch 108 of chute 45 which stops Z machine bringing the unit to operating conditions according to point IV°.

Should the apparatus or machine be contemplated as having opposite symmetrical parts cantilevered by 180°, as above described in connection with FIG. 1, it will be obvious that the above listed operating conditions can occur in each of said opposite parts, simultaneously, or any however intercalated sequence.

Operation of unit, which has been described for the sake of brevity in connection with only one of parts of X machine, that is in connection with a pusher 66, elevator 40–44 and storing chute 45, is as follows:

Suppose, for example, that both Y and Z machines are in a condition to operate. Microswitch for the so-called first speed, located on conveying belt 64 carrying articles to be wrapped to wrapping machine Z, has its contacts 1–3 and 2–5 closed, whereby relay $r1$ of first speed timer is energized by direct current supply by rectifier R1 and through closed contacts 3–1 of said microswitch MC. Relay $r3$ is also energized through pair of normally closed contacts 9–10 of electromagnetic switch $r1$ whereby supplying current to curren rectifier R2 and energizing relay $r2$ of second speed timer, through its pair of contacts 1–4 and said pair of contacts 9–10 of said electromagnetic switch $t1$.

Under these conditions, motor M operating wrapping machine Z is stationary. Now, by operating on manual pushbutton of microswitch P1, relay $r4$ is energized through manual stop press microswitch P2, said relay $r4$ remaining self-energized through the pair of contacts 1–4 and said stop press microswitch P2. Energization of relay $r4$, by its pair of contacts 2–6 and through contacts 3–1 of microswitch MC, causes relay $r5$ to be energized which relay is direct current supplied by current rectifier R1. Energization of said relay $r5$ causes, through its contacts 1–4 and stop microswitch P2, electromagnetic switch through its pair of contacts 1–2 and said stop microswitch P2. Microswitch MC1, located on conveying belt 59 carrying articles to be wrapped from supplying machine Y to machine X, in the absence of articles on said belt 59 and thus owing to lowered position of sensing element 112, has its contacts 1–3 closed, whereby timer relay $r6$, comprising capacitor $c3$ is energized with direct current supply by rectifier R1. Relay $r6$ being energized, switchover of its movable contact from position 3–9 to position 3–8 takes place with a resulting de-energization of relay $r7$. Closure of contacts 3–8 of said relay $r6$ cases, in phase through microswitch MC2 operated by cyclic cam 23, electromagnetic switch $r5$ to be energized, which remains self-energized by its pair of contacts 1–2, through microswitch MC2 operable by cyclic cam 24 and pair of contacts 1–5 of the deenergized relay $r7$. Energization of electromagnetic switch $t5$ causes with its pair of contacts 5–6, electromagnet 76 to be energized, which through arm 73, pivoted to armature or core 75 of said electromagnet and mandrel 71, causes blade element 70 to be rotated bringing it to a lowered intercepting position on conveying belt 59.

Articles O from supplying machine Y and forwardly carried in the direction of arrow $f$ by conveying belt 59 and guided in known manner against intercepting element 70, lean to one another to form a complete train of articles beneath the sensing element 112. At the section facing pusher 66, articles (as hereinafter will be seen) are held in aligned relationship between the pushing face of said pusher 66 and roller 68, forming a movable containment side, beneath which said articles pass automatically raising it when forwardly pushed by pusher 66. As long as the row of articles on conveying belt 59 is not completed, sensing element 112 is raised and lowered whenever an article passes beneath it, carried by belt 59, at each time opening microswitch MC1 for a short period.

Release delay of relay $r6$, due to capacitor $c3$ shunted therewith, is greater than the time being required for the passage of a train having a pre-determinated number of articles, essentially corresponding to the distance between microswitch MC1 and intercepting element 70, which is approximately equal to length of pusher 66 and hence transverse dimension of storing chute 45, so that passage of individual articles or by trains in a number less than the predeterminated number does not cause relay $r6$ to be deenergized and hence electromagnetic switch $t5$, with a resulting holding of blade element 70 at an intercepting position. When against intercepting element 70 a row of articles is formed, sensing element 112 will remain raised, whereby microswitch MC1 will open, so that, time predeterminated by capacitor $c3$ being over, relay $r6$ will release energizing with its pair of contacts 3–9 supplying relay $r7$, which cuts off supply by the opening of its contacts 1–5 to self-energization contacts 1–2 of electromagnetic switch.

At the same time, microswitch MC3 will be opened in phase by cyclic cam 24, whereby electromagnetic switch $t5$ also releases and will not be energized since, as seen, relay $r6$ in the meantime has de-energized.

Release of electromagnetic switch $t5$ causes opening of its contacts 5–6 and therefore the de-energization of electromagnet 76, whereby intercepting element 70 will be raised under the action of counter spring 77. By this time (set FIG. 3), pusher 66 is effecting a forward stroke, whereby (as it will be better seen hereinafter it will supply the conveying belt 64 with articles drawn from storing chute 45 and hold the articles stationary on conveying belt 59 by its edge transverse of said belt. As above mentioned, pusher 66, continously effecting its cyclic movements, when it is about to reach its maximum retraction position shown at point A of FIG. 3, abandons with its side edge the row of articles on belt 59, which will carry them against stationary stop 69 in a time approximatively corresponding to dwell A–AI°. Said pusher 66 will then start its stroke AI°–AII° bringing the articles forward of its pushing edge on cross member 44 of elevator 40–44 and below storing chute 45, where it will dwell for a time AII°–AIII°, holding articles advancing on conveying belt 59 still with its transverse edge.

While pusher 66 accomplishes such a stroke AI°–AII°, strip 92 will be raised by means of cam 21 of the vertical rod 86 having an idle roller 79 co-operating with said cam 21 and rocker arm 88, against which strip 92 the articles being pushed are stopped so as to be held in an aligned relationship.

During such dwell AII°–AIII° of pusher 66, said plate strip 92 (see FIG. 3), due to configuration of said cam 21 is lowered, whereby at the end of time AII°–AIII° pusher 66 will start a second stroke AIII°–AIV° bringing the articles on belt 64 which carries the same in the direction of arrow $f1$, to wrapping machine Z. Said pusher 66 will start then its return stroke effecting a first execution AIV°–AV°, hence in order to align possible articles dropped on elevator 40–44, as hereinafter will be seen, it will reverse its movement for a time AV°–AVI°, make a dwell AVI°–AVII° and then return to starting position A.

If arrival of articles from supplying machine Y is such that sensing element 112 is not enabled to close its microswitch MC1, in its continuous pushing strokes pusher 66 will uninterruptedly bring complete trains of articles O, which will be facing its pushing edge, from belt 59 to belt 64, as above seen. Conversely, should arrival of articles from machine Y be such that sensing element 112 is enabled to close microswitch MC1, relay r6 will then be energized and hence, as previously seen, electromagnet 76 will be energized, which electromagnet will bring blade element 70 to an intercepting position on belt 59, while pusher 66 will, as hereinafter seen, supply belt 64 from storing chute. In the meanwhile, articles supplied from belt 64 will reach microswitch MC located on said belt 64 switching the position of its contacts from 1–3 and 2–5 to 1–4 and 2–6. This switching causes relay r1 to be released at the time predeterminated by capacitor $x$ $c1$ and through the pair of contacts 3–8 of relay r4, self-energized as previously seen, the pair of contacts 3–9 of said relay r1, the pair of contacts 1–4 of the energized relay r2 and the pairs of contacts 9–10 and 7–8 of electromagnetic switch t3 and t2, respectively, will energize electromagnetic switch t1 starting motor M through its pairs of contacts 1 to 6. On energization of said electromagnetic switch t1, opening of contacts 9–10 of said electromagnetic switch t1 will take place, whereby on release of relay r3 supply to rectifier R2 will stop with a resulting release of relay r2 at the time predeterminated by capacitor $c2$. Thus, switchover from position 1–4 to position 1–5 of the contacts of relay r2 takes place, whereby electromagnetic switch t1 is de-energized and electromagnetic switches t2 and t3 are energized through the pairs of contacts 3–8 of relay r4, 3–9 of relay r1, 1–5 of relay r2 and 7–8 of said electromagnetic switch t1, thus ensuring the operation of motor M. Electromagnetic switches t2 and t3 are further supplied also through the pairs of self-energization contacts 1–2 of electromagnetic switch t3, the pair of contacts 6–2 of microswitch MC and the pair of contacts 9–10 of electromagnetic switch t4.

As above stated, should the arrival of articles from machine Y be such that sensing element 112 is enabled to close microswitch MC1, relay r6 will be energizing and hence, as previously seen, electromagnet 76 will be energized bringing the blade element 70 to an interpecting position on belt 59 while continuously travelling pusher 66 supplies belt 64 with articles being drawn from storing chute 45. In fact, as above explained, with the blade element 70 at intercepting position on belt 59, energization of relay r6, de-energization of relay r7 and energization of electromagnetic switch t5 will occur whereby relay r8 will be energized through the pairs of contacts 3–9 of relay r7, 3–4 of energized electromagnetic switch t4, 9–10 of telebreaker t5, microswitch MC6 cyclically operated by cam 27 and microswitch 108 of chute 45, being closed due to the presence of articles in said chute 45. Energization of relay r8, which through its pair of contacts 1–2 remains self-energized through microswitch MC7 cyclically operated by cam 28, causes with its pair of contacts 2–6 energization of electromagnetic switch t7, which, besides being supplied through said relay r8, is also supplied through its pair of contacts 1–2 being self-energized through microswitch MC5, cyclically operated by cam 26. With its pairs of contacts 3–4 and 5–6, energization of electromagnetic switch t7 causes electromagnet 101 to be energized, which electromagnetic switch by movement of its core 100 and through levers 97–98 against the action of the counter spring 102, will produce straddle of tooth elements 95–96, allowing articles in storing chute 45 to be dropped on the cross member 44 beneath the elevator 40–44.

Therefore, in phase with operating cam 27 of energising microswitch MC6 of relay r8, strip 92 will be raised as a collating element by cam 21 and relative associated members already previously mentioned (see FIG. 3) so as to hold said articles having dropped from chute 45 on the cross member 44 beneath of the elevator 40–44 in an aligned relationship. As already seen, said strip 92 is then lowered, and pusher 66, with its pushing edge, will provide for transferring a layer of articles at a time on belt 64, the second layer being partially restrained within said chute so as to lean with its lower surface or side on the upper surface or face of the pusher during such a stroke thereof.

On persistence of lack of articles under the sensing element 112, pusher 66 will continue to supply conveying belt 64 with articles provided by chute 45 as now described. Instead, when on belt 59 a row of articles is formed against the intercepting blade 70 and in such a number to raise sensing element 112 thus opening microswitch MC1, at the time predetermined by capacitor $c3$, that is before release of relay r6 and electromagnetic switch t5 through the opening of microswitch MC3 operated by cyclic cam 24, self-energization for relay r8 is removed by the opening of microswitch MC7 operated by cyclic cam 28, whereby on release of said relay r8, electromagnetic switch t6 will be energized through the pair of contacts 2–7 of said relay r8 and pair of contacts 7–8 of the still energized electromagnetic switch t6, which by closure of its pairs of contacts 3–4 and 5–6 will energize electromagnet 32 so as to engage with its armature or core 33–34 the groove 36 of cam 18 displacing it on axis 15 to cause roller 38, associated with rod 40 of elevator 40–44, to be engaged within the groove 37 of cam 19, thus raising the articles resting on cross member 44 of said elevator within storing chute 45.

While elevator is at its maximum raising position, microswitch MC5 is opened by cam 26, whereby also electromagnetic switch t7 releases de-energizing electromagnet 101 so as to allow tooth elements 95–96 to close, under the action of counter spring 102, below the articles resting on the cross member 44 of the elevator at a still raised position. In the meantime, also relay r6 and electromagnetic switch t5 de-energize, whereby on release of electromagnetic switch t7, in phase with the microswitch operated by cam 25, current is cut off also to electromagnetic switch t6 which will cause on releasing the de-energization of electromagnet 32 stopping the elevator at its lower position (for phase-times see FIG. 3). Release of electromagnetic switch t5 causes de-energization of electromagnet 76, whereby intercepting element 70 is raised thus restarting supply to belt 64 as previously described.

As it can be readily seen from the operative steps just described, supply to wrapping machine Z by conveying belt 64 occurs at each machine cycle with cyclically continuous and always positive movements of pusher 66 supplying said belt 64 or from belt 59 wtih articles from supplying machine Y or storing chute 45. Should the wrapping machine Z stop, electromagnetic switch t4 will be de-energized through its self-energizing pair of contacts 1–2, as it can be seen from other application of the same applicant under the same date. In this case, articles from supplying machine Y and advancing on belt 59, are stored within the chute 45. In fact, in a repetition of the above described steps relatively to the intercepting blade 70 in function of the articles on belt 59, when said articles are in front of the pushing edge of pusher 66 and brought by said pusher 66 above the cross member 44 of elevator 40–44 electromagnetic switch t6 (see FIG. 2) will be energized through the pair of normally closed contacts 13–14 of electromagnetic switch t4 which is de-energized, and through the pair of normally closed contacts 11–12 of also de-energized electromagnetic switch t5, said electromagnetic switch t6 cyclically operating elevator 40–44 raising the articles within the chute 45, passing between tooth elements 95–96 at closed position below the lower edges of said chute 45, winding them against the action of spring 102 and depositing said articles on said tooth elements 95–96, which will close again below the articles under the action of said spring 102. During these steps of storing into the chute 45, should the wrapping machine Z be capable of restarting operation thereof, the above described operative conditions would be established by acting on manual press microswitch P1 with both Y and Z machines operating. Instead, should shut down of wrapping machine Z persist, the articles from wrapping machine Y would be continuously stored until, the upper level of chute 45 being reached, they would operate on sensing element 106 to close microswitch 109 also stopping supplying machine Y.

In addition to the exemplifyingly described operative conditions in connection with the above listed points I° and III°, it is apparent through the electromechanical basic diagram shown in FIG. 2 that also all the other operative conditions are controllable both individually and in any of the combinations listed in the remaining points II°–IV°–V° and VI°, which have not been described in detail for obvious reasons of description brevity. It is therefore evident by such an apparatus the appreciable technical-practical benefit provided in the specific range of installations for automatically wrapping articles. In fact, due to the greater speed of wrapping machines, Z machine in the case being discussed, with respect to supplying machines, Y supplying machines in case being discussed, by the apparatus of the invention such wrapping machines are at any machine cycle always supplied independently of supply capacity of supplying machines by automatically drawing, when required, articles from the storing chute. Thus, a further advantage is attained due to the possibility of always having at disposal some space in the storing chute for the storing of articles in case of an accidental shut down of the wrapping machine.

I claim:

1. An article transfer apparatus essentially comprising first conveyor means for conveying articles from at least one delivery machine to a transfer station, second conveyor means for conveying articles from said transfer station to at least one reception machine, storage means arranged above said transfer station, pusher means adjacent said transfer station for cyclically pushing articles from said first conveyor means to said second conveyor means, said pusher means being arranged to dwell adjacent said storage means at least once per cycle, elevator means for raising articles from said transfer station into said storage means during said dwell of said pusher means, interception means for intercepting the flow of articles from said first conveyor means to said transfer station and arranged along the run of said first conveyor means, release means for releasing articles from said storage means to said transfer station in the path of said pusher means, first electrical control means capable of sensing the operative condition of said delivery machine and said reception machine and second electrical control means, arranged so as to be electrically controlled by said first electrical control means and capable of actuating said elevator means when said delivery machine is operative and said reception machine is inoperative and for actuating said release means and said interception means when said delivery machine is inoperative.

2. Article transfer apparatus according to claim 1, wherein said pusher means is made to carry out a movement including an initial stroke from said first conveyor means towards said second conveyor means, a dwell adjacent said storage means, a further stroke to said second conveyor means, a return stroke from said second conveyor means towards said first conveyor means, a dwell adjacent said storage means, a brief reversal stroke towards said second conveyor means, a dwell, and a return stroke to said first conveyor means.

3. Article transfer apparatus according to claim 1, in which said first electrical control means comprise a first sensing device for sensing the presence of articles on said first conveyor means and arranged between said delivery machine and said interception means, first electrical switch means between said first sensing device and said interception means, and second electrical switch means between said first sensing device and said release means; said second electric control means comprising a second sensing device arranged between said reception machine and said elevator means and third electrical switch means between said second sensing means and said elevator means.

4. In an apparatus according to claim 1, comprising two sets of conveying means for supplying the articles to said transfer station and a set of conveying means for supplying said articles from said transfer station to said receiving machine, the combination comprising for each of said sets of supplying means a storing chute with relative associated means for enabling, upon control the drawing of stored articles, said chute being arranged at said transfer station between said corresponding conveying means to the transfer station and said conveying means for the articles from said station to said receiving machine; a plurality of pusher means, a plurality of elevating means, and a plurality of intercepting means, all of said means operated by each corresponding conveying means for the articles to the transfer station being interconnected in a cyclic phase set off by 180° to one another.

References Cited

UNITED STATES PATENTS 3,340,992  9/1967  Seragnoli ___________ 198—24
3,360,100  12/1967  Seragnoli ___________ 198—24

EDWARD A. SROKA, *Primary Examiner.*

U.S. Cl. X.R.

198—31